May 28, 1963 F. W. BLAKE 3,091,476
FOUR WHEEL FARM CART
Filed March 27, 1961 2 Sheets-Sheet 1

INVENTOR.
FRANCIS W. BLAKE
BY

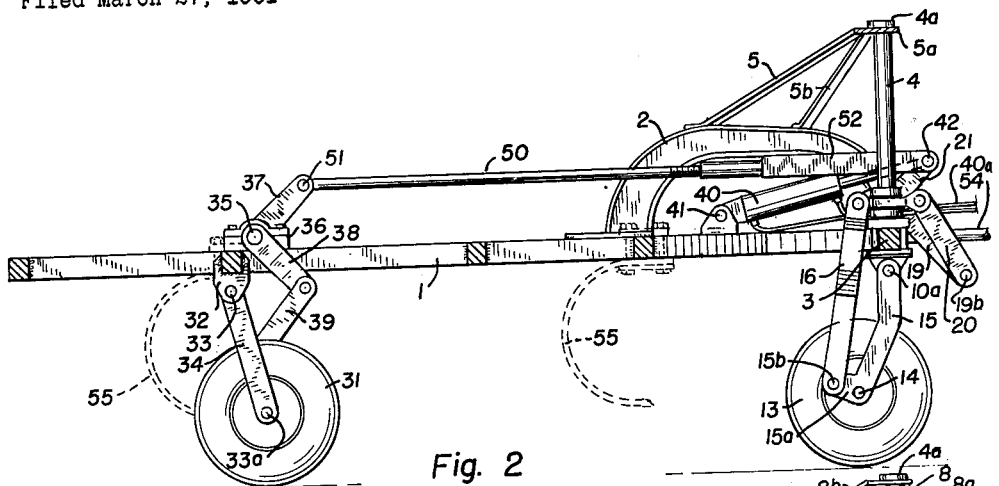
Fig. 2
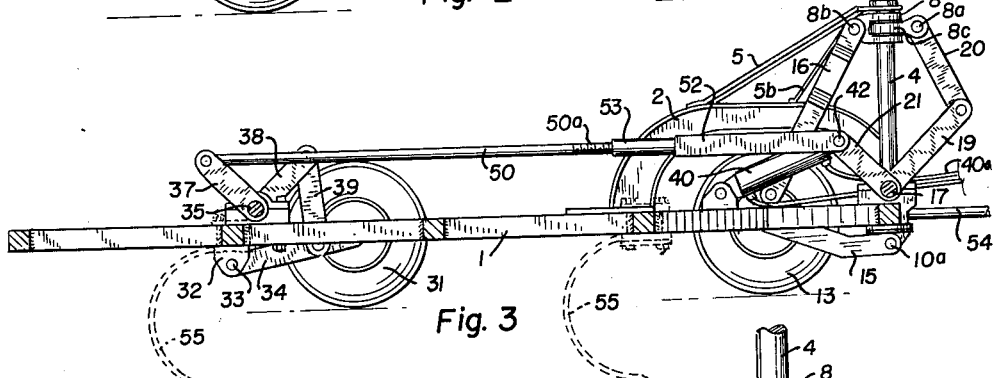
Fig. 3
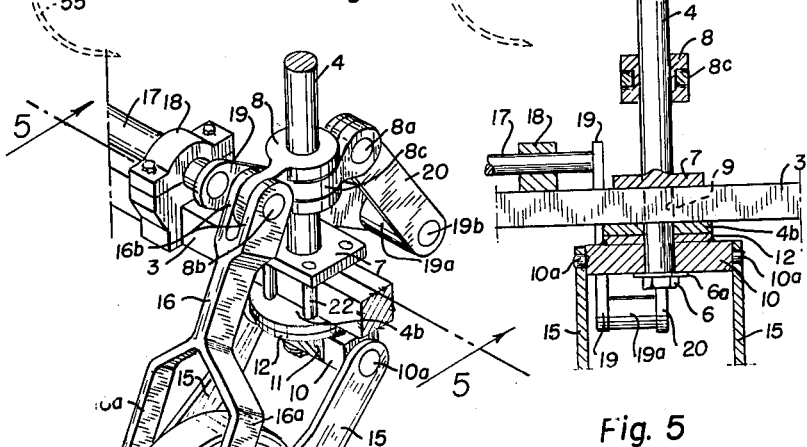
Fig. 4
Fig. 5
INVENTOR.
FRANCIS W. BLAKE
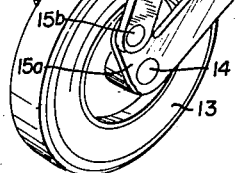

United States Patent Office 3,091,476
Patented May 28, 1963

3,091,476
FOUR WHEEL FARM CART
Francis W. Blake, Rural Route, Hereford, Colo.
Filed Mar. 27, 1961, Ser. No. 118,208
2 Claims. (Cl. 280—43.13)

This invention relates to farm carts generally, having four wheels, and more particularly to lift type farm tool carts having four wheels, including a pair of front castor wheels, by a raising and lowering of all four wheels simultaneously to effect a horizontal raising and lowering of the cart by its frame, by hydraulic means, and without the need of a rigid hitch to effect such raising and lowering. I have perfected a large farm tool cart, adapted for large farming operations and for any one of plural uses, by interchangeably mounting any one of different farm tools thereon as operations may at the time require, such as cultivators, seed drills, plows, discs, and other farm tools. By way of illustration I show dry land chisels attached to the frame of my cart, but it is to be understood that any one of many other type farm tools may be secured to the frame thereof, of the type extending below the frame into, or for working the soil.

More particularly, it is a principal object of my invention to provide a four wheel cart of the type described, having two front wheels freely and independently pivotally mounted by a novel castor-like construction and adapted for simultaneous raising and lowering of all four wheels in unison and to the same extent with relation to the frame of the cart.

Another principal object of my invention is the provision of a novel pair of front castor wheels for my farm cart, and which are individually mounted for independent and free horizontal pivotal movement, and also being adapted for the same unison vertical movement as a pair with relation to the frame of my cart.

Another object of my invention is the provision of a novel castor wheel structure, for use with farm carts of the type described, capable of vertical adjustment with relation to the frame of the cart to which attached, and which is of novel simple construction, durable in service, and highly efficient in operation.

The foregoing and other objects and advantages will become readily apparent as the disclosure progresses and particularly points out those features considered of special importance in connection with the construction and operation of an illustrative embodiment of my invention herein. Therefore, this invention is to be considered as constituting the construction and combinations as set forth in the following detailed description and thereafter in the appended claims hereof, reference being had to the accompanying drawings, in which:

FIGURE 2 is a cross-sectional view taken on the line 2—2 of FIGURE 1 and looking in the direction of the arrows and with all the wheels lowered;

FIGURE 3 is another cross-sectional view taken on the line 3—3 of FIGURE 1 and looking in the direction of the arrows and with all the wheels raised;

FIGURE 4 is an enlarged partial elevational view of one of my novel front castor wheels; and FIGURE 5 is an enlarged partial cross-sectional isometric view taken on the line 5—5 of FIGURE 4 looking in the direction of the arrows.

Figure 1:
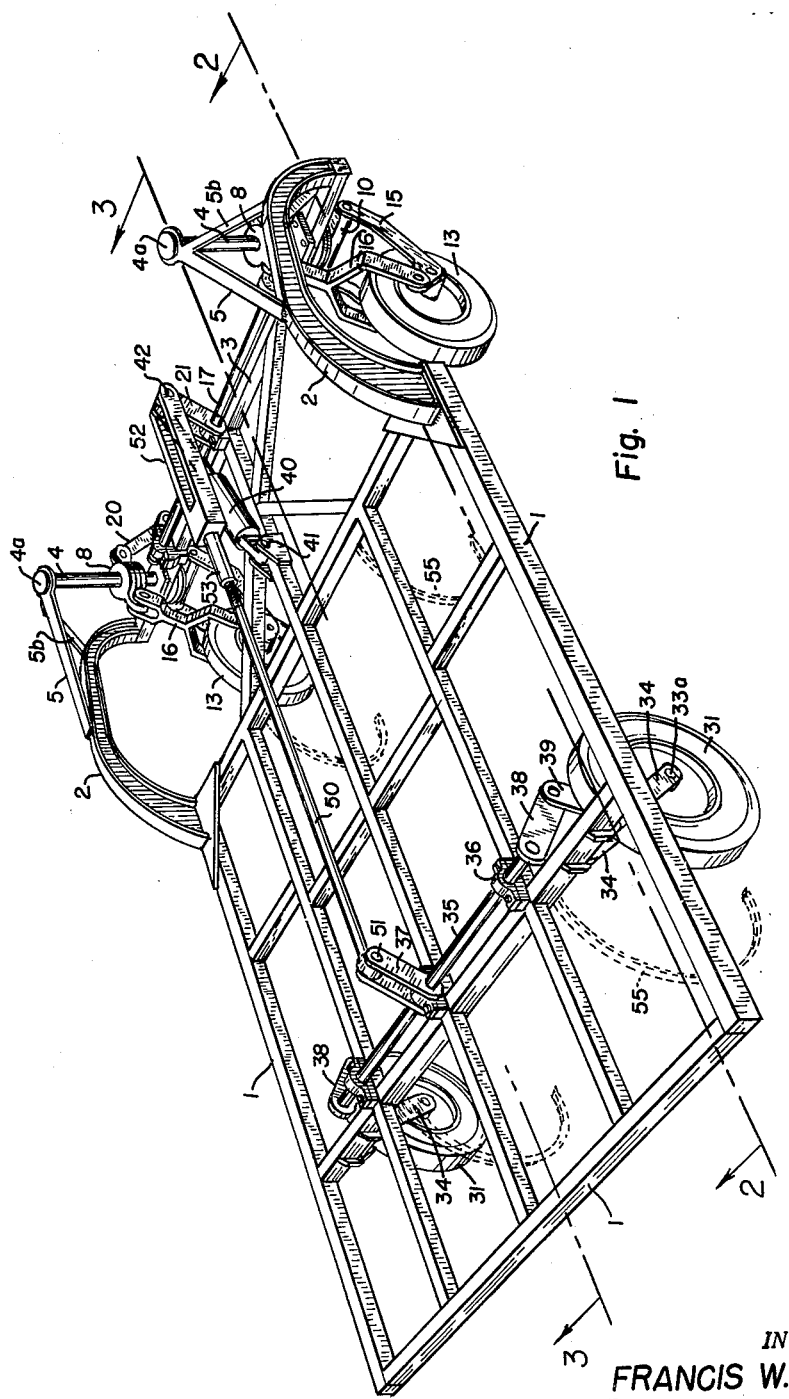
FIGURE 1 is an elevational or perspective view of a farm cart, of the type described, having my invention therewith.

In large scale farming, because of the number of large scale and type of farm implements interchangeably mounted on the tool cart, for various farming operations, I provide a large sturdy cart having a horizontal rigid frame 1, of the design illustrated, having front crescent-shaped side wells 2, under which the castor wheels are free to swing laterally, front frame cross-bar 3, and with four wheels, being two rear wheels 31 and two front ones 13, with each of latter two being castor-mounted. The two rear wheels are mounted to travel in parallel alignment with each other and the longitudinal axis of frame 1.

I provide a novel identical pair of front castor wheels 13, on the frame bar 3, with each of them inwardly of and adjacent its crescent well 2, and with each wheel 13 assembly being pivotally mounted for free horizontal swinging in a flat plane on a vertical stationary round rigid post 4. FIGURES 4 and 5 illustrate my construction of the right front castor wheel assembly, of FIGURE 1, and the left one would be identical except the parts 17, 18, 19 and 19a would be to the right side of its post 4. I provide an opening 9 for the round post 4 in frame bar 3, through which the post is adapted to fit snugly, as illustrated. I provide a brace 5—5b, and, in assembly I insert the threaded end of post 4 down through an opening provided in horizontal portion 5a of 5, and then a snugly fitting and slidable and rotatable toggle ring 8 is placed on the post 4, and then the post is inserted further downwardly through an upper binder plate 7, the latter also having an opening to permit 4 to extend therethrough, and then the post 4 is inserted downwardly through opening 9 of bar 3, as illustrated. Post 4 is provided with an enlarged head 4a larger than the opening of horizontal portion 5a, of brace 5, so that the post rests on 5a, being held by 4a thereon. Post 4 is of a length adapted for its lower end to extend below frame bar 3 as illustrated, and has its lower end screw-threaded for receiving a nut 6 thereon. Before nut 6 is placed on lower end of 4, I place a circular second binder-and-flat-pivot-place 4b, also having a central opening for snugly and rotatably receiving post 4 therethrough, also on the post, and then binder plates 4b and 7 are secured firmly together and on frame bar 3 by suitable sunken-headed-tie-bolts 22, and then I place a castor wheel swivel-upper-sprocket-assembly 10–12, with the latter unit also having a central opening snugly adapted to receive and rotate on 4, onto that lower end of post 4, and then a smaller washer 6a is placed over 4 and then the nut 6 is screw-threaded in place in that lower end. Post 4 is of such a length that, after its assembly, as just explained, the nut 6 firmly exerts pulling pressure through 4 of the head 4a against brace portion 5a, and also then the nut 6 and washer 6a act to hold unit 10–12 upwardly against plate 4b, but not so tightly as to prevent free swivel movement of 10–12 under 4b on 4. Though not shown, it is to be understood that it is advisable to use a thin nylon graphited washer between members 4b and 12, in conventional manner. Braces 5 and 5b are welded together and to the well 2 as illustrated, and are provided to firmly hold post 4 in position, as illustrated and just explained, against the tendency of the swivelling of the front wheel exerting a downward pull on the bolt by members 10–12, on such swivelling and due to the weight of the cart. Upper sprocket swivel-plate assembly 10–12, of a castor wheel, comprises a stub member 10, having outer ends pivot projections 10a, and which is welded to the large flat swivel washer 12, with angle wedge supports 11 welded between 10 and 12, as illustrated, and both 10 and 12 having an aligned opening for receiving post 4 through that opening, as explained and illustrated. Swivel plates 4b and 12 are of the same diameter. A pair of identical shaped dog-leg-like sprocket arms 15 are provided for each front castor wheel, and having their upper ends suitably pivotally connected at 10a to stub bar 10, of shape as illustrated and with each having an upwardly short extension portion 15a, and to the upper ends of the latter a wishbone lifter yoke-sprocket 16 has its lower ends suitably pivotally secured thereto. The front wheel is suitably axially mounted between members 15, at the bent bottom portions 15a of a pair of the arms 15, as illustrated, at point 14. Elevator lifter wishbone sprocket member 16 has each of its lower ends pivoted at points 15b of main sprocket members 15, and has its upper end bifurcated into prongs 16b for suitable pivotal mounting of the latter at 8b to the projection on that side of slidable toggle 8. Toggle 8, on post 4, comprises a slidable collar on that post, having the one pivot projection therefrom for pivot mounting at 8b just explained, and is provided with a recessed groove on its central outer periphery and in which groove I place a suitable conventional slidable strap member 8c, for purpose to be explained. Ends of member 8c are formed into a pivot holding socket, in conventional manner, for receiving a suitable pivot pin 8a, for purpose to be explained.

To the upper surface of front frame bar 3 I suitably journal a rotatable bar 17, by suitable bearing members 18, and centrally of bar 17 I rigidly suitably secure a pair of aligned crank arms 21 projecting therefrom, and at each end of that rotatable bar 17 I suitably rigidly secure a yoke arm 19 also projecting at a right angle therefrom. Members 19 and 21 are of equal length, and I preferably so secure the one thereof at about a ninety degree angle to the other thereof, axially of the bar 17, for reason to be explained, and as viewed in FIGURES 2 and 3. A suitable right angle stub crank portion 19a projects from arm 19 adjacent post 4 and is provided with a suitable outer and right angle thereto pivot portion 19b. I suitably connect pivot points 8a and 19b by a suitable pivot link member 20. It is to be understood that I provide identical construction to that explained for each front wheel 13, post 4, toggle 8 and at each end of rotatable shaft 17. To cause rotation of that shaft 17, I provide a conventional double acting hydraulic cylinder 40, by hydraulic power by conventional means, conveyed through hydraulic hoses, shown as 40a, from the tractor, not illustrated, which pulls the cart, as will be understood. I mount the hydraulic cylinder on top of the front center frame bar of my cart, by pivoting its lower portion to a suitable pivot bracket as at 41, as illustrated, in FIGURES 2 and 3, in conventional manner. The piston arm, of the hydraulic cylinder 40, I suitably pivotally mount, in conventional manner, to the pivot pin 42, provided for the purpose, at the outer ends of the pair of crank arms 21, as illustrated.

Each of the rear wheels 31 I pivotally mount to the under side of the rear of the frame 1, by a pair of like rigid sprocket arms 34, in conventional manner, by suitably pivoting the upper ends thereof at 33 to a bracket 32 provided for the purpose, on the under side of the frame, and mounting the said wheels at the lower ends of said arms at 33a, as shown, in conventional manner. I provide a similar yoke-bar 35—38—38, to the front yoke-bar 17—19—19, rotatably journalled in suitable conventional bearings 36 onto the rear cross frame portion of cart frame 1, as shown, in FIGURE 1, and I provide a bifurcated or aligned pair of crank arms 37 projecting from the central portion of rotatable bar 35 and rigidly secured to 35. Crank arms 37 are of the same length as crank arms 21. A rigid tie rod 50, having an adjustable-in-length-end cooperating with a screw sleeve 53, is suitably secured rigidly longitudinally with and to a bifurcated extension member 52, in conventional manner, and the extreme ends of that assembly 50—53—52 are pivotally suitably and conventionally secured to pivots 51 and 42, as illustrated in FIGURE 1, respectively of crank arms 37 and 21. Arms 37 and 38, of rotatable shaft 35, are also of equal length, and are also of equal length to the equal lengthed front shaft crank arms 21 and 19, for reason to be explained. A pair of like crank links 38 are rigidly secured to shaft 35, with one thereof at each end thereof, and so as to extend at a right angle therefrom to comprise a yoke therewith, in conventional manner, and with each thereof being of equal length to front crank members 19. Cranks 37 and 38 project radially from their shaft 35 with each of 37 being at about a right angle to each of 38, for reasons to be explained. A pair of equal length pivot connecting arms 39 are provided, with each to pivotally connect the end of one of the pairs of cranks 38 with a suitable pivot provided on inner sprocket 34 of its adjacent rear wheel 31, in conventional manner, at a common pivot point on each of said sprockets slightly upwardly thereof from the adjacent wheel axle 33a, as illustrated in FIGURES 2 and 3, by the one end of a pivot arm 39 being suitably pivoted to the outer end of its adjacent crank 38, and by the other end of that arm 39 being suitably pivotally connected to its adjacent pivot on said sprocket 34.

During assembly of my novel cart, the positioning of the pair of cranks 21 and 19 of front rotatable shaft 17 on the one hand, and of the pair of cranks 37 and 38 of the rear rotatable shaft 35 on the other hand, are identical on the respective shafts 17 and 35 of each, in radial arc relationship of the longitudinal axis of those shafts. The relative positioning to the vertical of the cranks 19—19, of front rotatable shaft yoke assembly 17—19—19, and of such positioning to the vertical of the cranks 38—38, of rear rotatable shaft yoke assembly 35—38—38, are identical, by having the correct length of the tie-rod assembly 50—53—52 as illustrated in FIGURES 2 and 3. By that construction the aligned pair of arc rotatable rear cranks 37, and the rod assembly 50—53—52, and the aligned pair of arc rotatable front cranks 21, and the top surface of frame 1, as viewed in FIGURES 2 and 3, at all times, in any equal pivotally-rotatable movement of the shafts 35 and 17, caused by operation of cylinder 40 as a result of my structure, form an equal parallelogram, for reasons to be explained and as will be obvious for equal vertical movement of my pivotally mounted four wheels. It will be seen that movement of the plunger arm of hydraulic cylinder 40, as a result of my structure, will effect an equal and unison arc pivotal movement of all four of my wheels with relation to my cart frame, since each of the pairs of cranks 38—38 and 19—19 are of equal length and assembled in the same arc alignment to the vertical, radially of their respective shafts 35 and 17, and since each of my four aligned pairs of pivotal sprocket arms 34—34 and 15—15, as between the upper pivot points and axle of pertinent wheel of each pair, are of equal lengths.

It is to be understood that my novel cart may be pulled by a non-raisable pivot-pull type of tow bar 54 by a tractor or other suitable pulling means having a conventional double-acting hydraulic master cylinder therewith, and that the direction of forward pull of my cart is to the right as viewed in FIGURE 1. The kind of farm tool interchangeably and removably secured to the frame 1 of my cart, as explained, I diagrammatically illustrate by the dotted line dray-land chisels 55 of FIGURES 2 and 3.

Further operation of my novel cart will be apparent to those skilled in the art. The ability to move and hold all four wheels of the cart vertically with relation to the frame thereof and in unison is important in order to be able to get the same use functioning out of each of the plural farm tools 55 secured thereto, in this type large farm tool cart. To accomplish such use, each of the tools carried by the frame 1 must be operatively held thereby in the same relative position in, on or above the ground, as may be required according to the type of tool used, and since a plurality of the same kind of tools it will be understood are uniformly secured to the cart frame and are each of the same shape, design and size.

My novel pair of front castor wheels construction, upon a towing of my cart forwardly, or to the right as viewed in FIGURES 1, 2 and 3, permits each front wheel 13 to rotate in the same flat plane horizontally on its pivot, being on its post 4, independently of the other front wheel, for efficient operation over uneven contour of the surface of the land where the cart is being used.

My novel construction, as explained in detail heretofore, accomplishes a unison and uniform pivot holding, raising or lowering of my novel pair of front castor wheels, as the case may require, with relation to frame 1, in each case by the hydraulic cylinder 40, through 21—17—19—19a—20—8—16, to pivot point 15b, which controls or holds the pivotal vertical positioning of the pair of sprockets 15 on their pivots 16a, for thereby controlling or holding each wheel thereof; while I have just mentioned one of my castor wheel assemblies, it is to be understood that the other castor wheel is a duplicate on the other side of the frame front end; and, in that operation, through the shaft 50—53—52, my pair of rear wheels are at the same time simultaneously and equally so vertically held, raised or lowered, with relation to the frame, and in the identical such relative positioning to the frame as the set of front wheels, by said cylinder same movement, causing a rotational movement of the rear rotatable yoke assembly 35—38—38 and therewith a holding or pivotal vertical movement of the rear wheels through pivot links 38 and 39 and 34 to the rear wheels 31.

Since many changes and modifications could be made in my invention without deviating from the spirit, teaching and scope of my invention, by those skilled in the art, I distinctly wish only to be bound as to the teaching, scope, disclosure, spirit and meaning of my invention by the hereunto appended claims; for example, I have perfected a plurality of pairs of rotatable and folding pivot-link assemblies for vertically operating and holding four wheels of a farm cart all equally and in unison, with relation to the frame and at the same time keeping the frame always in a horizontal plane, and all of such in combination with my novel independently horizontally rotatable castor-type pair of front wheels as a part of said set of four wheels.

What I claim and desire to secure by Letters Patent is:
1. In combination:
   (A) a cart body;
   (B) a cross-bar mounted on said cart body;
   (C) a rotatable shaft mounted for rotation parallel to said cross-bar;
   (D) a pair of wheel units fixed on opposite sides of said cart body, each of said wheel units including,
      (a) a post fixed on said cross-bar and extending vertically therefrom,
      (b) a rotatable coupling means mounted on said post and having first and second opposed coupling elements,
      (c) first linkage means connecting said first coupling element with said rotatable shaft for reciprocating movement of said coupling means in response to rotation of said shaft,
      (d) a wheel,
      (e) second linkage means connecting said second coupling element with said wheel,
      (f) said first and second linkage means being pivotally connected to said first and second coupling elements,
      (g) a rotatable coupling unit mounted in alignment with said post,
      (h) arm means connected between said rotatable coupling unit and said wheel, said arm means being pivotally connected to said unit,
whereby rotation of said rotatable shaft causes reciprocation of said coupling member on said post and in turn reciprocating movement of said wheel, and whereby said wheel is simultaneously pivotal with respect to said post.

2. In combination, a farm tool cart comprising, a horizontal, rigid and flat frame, having a front cross bar, four vertically, pivotally mounted wheels carried by the frame and adapted to extend therebelow, the frame having aligned elevated front wheel wells, two of the wheels being positioned as a front pair adjacent said wells and with the other two wheels being positioned as a rear pair, like pivot yoke means carried by the frame for pivotally mounting each wheel to the frame, a pair of like rotatable members, each having a shaft portion and equal crank ends and each shaft portion being rotatably carried by the frame, one rotatable member being positioned between the front pair of wheels and the other between the rear pair of wheels, with the shaft portions positioned parallel to each other and to the frame and equi-distant from the plane of the frame, journal means on the frame for so rotatably carrying the shaft portions of each shaft thereon, like pairs of linkage means for pivotally connecting the crank end of each adjacent shaft with the yoke means of an adjacent wheel of a pair of wheels, a radial crank extending from each shaft portion and parallel with each other, rod means for pivotally connecting the radial cranks of each shaft portion, said connecting rod being adjustable in length, a double acting power means pivotally connected to the frame and having a push-pull piston-rod means extending therefrom and being operatively connected to said radial cranks and connecting rod whereby upon any piston-rod push-pull movement by the power means the shafts are rotated by said adjustable connecting rod and radial cranks, the longitudinal axis of the adjustable connecting-rod and the longitudinal axis of the radial cranks and the plane of the frame together comprise a parallelogram, a castor pivot-like mounting means for each front wheel, to which the adjacent front wheel pivot yoke means is attached, and carried by the frame front cross-bar and adapting each of the front wheels for free and independent horizontal pivotal movement in a common flat plane, said castor pivot-like mounting including a vertical post rigidly mounted on the front cross-bar of the frame, and a toggle means, as a part of said linkage means for a front wheel, being slidably mounted on and carried by the post, and with one end of the toggle means pivotally connected to the adjacent crank end portion of said front rotatable shaft, and with the other end of the toggle means being pivotally connected to the pivotal front wheel carrying yoke means.

References Cited in the file of this patent
UNITED STATES PATENTS 2,762,631   Entz _____ Sept. 11, 1956
2,835,400   Latzke _____ May 20, 1958